United States Patent [19]

Beaulieu

[11] Patent Number: 4,934,858
[45] Date of Patent: Jun. 19, 1990

[54] FASTENING DEVICE FOR SUPPORT STRUCTURES

[75] Inventor: Bryan J. Beaulieu, Burnsville, Minn.

[73] Assignee: Skyline Displays, Inc., Burnsville, Minn.

[21] Appl. No.: 353,901

[22] PCT Filed: Aug. 27, 1987

[86] PCT No.: PCT/US87/02157
§ 371 Date: Feb. 21, 1989
§ 102(e) Date: Feb. 21, 1989

[87] PCT Pub. No.: WO89/02035
PCT Pub. Date: Mar. 9, 1989

[51] Int. Cl.⁵ ............................................. F16B 7/04
[52] U.S. Cl. ...................................... 403/174; 403/12;
403/178; 403/217; 403/264; 403/297; 211/192
[58] Field of Search .............. 403/12, 174, 178, 170,
403/217, 255, 297, 403, 264, 405.1; 52/108;
135/104, 114; 248/160; 211/191, 192, 182, 189

[56] References Cited

U.S. PATENT DOCUMENTS

| 870,429 | 11/1907 | Grimler | 248/160 |
| 2,926,941 | 3/1960 | Thompson | 403/173 |
| 3,620,558 | 11/1971 | MacMillan | 403/297 X |
| 3,797,948 | 3/1974 | Weininger | 403/245 |
| 3,901,613 | 8/1975 | Andersson | 403/174 X |
| 4,270,872 | 6/1981 | Kiyosawa | 403/170 |
| 4,658,560 | 4/1987 | Beaulieu | 211/182 X |

FOREIGN PATENT DOCUMENTS

| 444424 | 2/1972 | Australia . |
| 2348239 | 4/1974 | Fed. Rep. of Germany . |
| 1361398 | 4/1963 | France . |

Primary Examiner—Andrew V. Kundiat
Assistant Examiner—Franco Deliguori
Attorney, Agent, or Firm—Paul L. Sjoquist

[57] ABSTRACT

A fastening device for use in support structures wherein the fastening of support members is accomplished by slidably inserting end connectors into slotted fastening devices to produce a final locking fit between the support members and the fastening device. A keyed screw which holds the fastening device and support member in an intermediate locking position to aid in the overall assembly of the support structure.

23 Claims, 5 Drawing Sheets

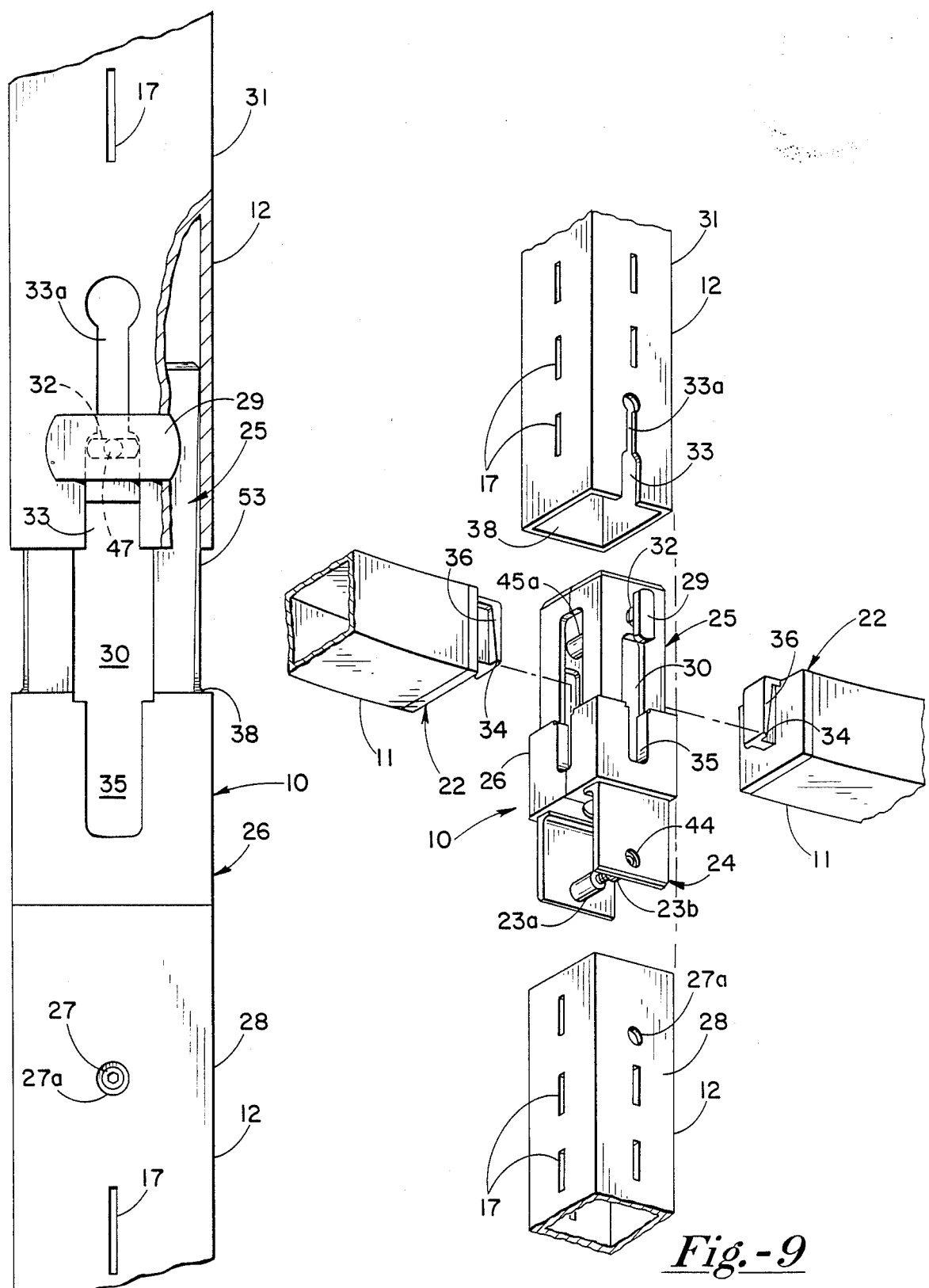

FASTENING DEVICE FOR SUPPORT STRUCTURES

BACKGROUND OF THE INVENTION

The present invention relates generally to fastening devices and more particularly to fastening devices for use in lightweight support structures, such as display frames.

Description of the Prior Art

Structures using the type of fastening devices disclosed in the present application are known generally as space frames and are constructed using lightweight, interchangeable modular elements.

One example of a fastening device commonly used on this type of support structure is disclosed in U.S. Pat. No. 3,356,395, issued to Dygert, et al on Dec. 5, 1967. The Dygert patent discloses the use of an adjustable clamp to connect the horizontal and vertical members of a support frame. In Dygert, the clamp consists of a fitting through which the vertical support member is inserted. The clamp further includes a bell crank which is rotated to hold the horizontal member at the desired height along the vertical member.

A similar fastening device is disclosed in U.S. Pat. No. 3,362,738 issued to Dygert, et al on Jan. 9, 1968. This second Dygert patent discloses another adjustable clamp wherein a spring biased pin is used to adjustably hold the horizontal member to the vertical member.

Another type of fastening device is disclosed in U.S. Pat. No. 3,888,441 issued to Rebentisch on June 10, 1975. The Rebentisch patent discloses the use of a tubular vertical support member having rectangular-shaped openings and a support bracket. The one-piece support bracket consists of an upper T-shaped extension and a lower tab-shaped extension both of which are inserted into the rectangular-shaped openings on the vertical member. A second Rebentisch patent, U.S. Pat. No. 3,888,440, issued June 10, 1975, discloses a two-piece support bracket consisting of a locking clip and a separate support arm having a T-shaped extension which is inserted into the rectangular-shaped openings on the vertical member.

Summary of the Invention

An advantage of the present invention is that the fastening device disclosed herein may be used in a variety of support frames.

Another advantage of the present invention is that it is particularly designed for use in modular units wherein the individual elements are readily interchangeable.

Another advantage of the present invention is that once the elements are initially installed, the framework may be assembled or disassembled without the use of any tools.

In accordance with the present invention, a fastening device is provided which is suitable for a variety of uses, but which is particularly adapted for use in display frames. The overall framework consists of vertical and horizontal members which are fastened together using the fastening device of the present invention. The fastening function in the present invention is achieved by locking an end connector to a fastening device. The end connector is preferably fitted into the end of a horizontal member and, during assembly of the framework, is inserted into grooves formed in the fastening device. The fastening device is preferably attached to one end of a vertical member and is designed to slidably insert into the end of a second vertical member. The fastening device further includes a keyed screw to allow the insertion of the end connector into the fastening device while the elements are held in an intermediate locking position. Once the end connector has been inserted into the fastening device, the keyed screw is turned 90° to allow the second vertical member to slide to the final locked position. As the second vertical member slides into the final locked position, the end connector on the horizontal member is pushed into a narrow groove on the fastening device and is rigidly held in position.

For purposes of this description, the terms "vertical member" and "horizontal member" are merely illustrative of relative space positions of frame members; in actual practice it is apparent that frame members can be aligned in either orientation.

It is an object of the present invention to provide a fastening device which is adaptable for use in display frames.

It is another object of the present invention to provide a fastening device which is readily replaceable when damaged or broken.

It is another object of the present invention to provide a display frame which utilizes modular elements to provide a final framework capable of assuming nearly any shape or size.

It is another object of the present invention to provide a fastening device having an intermediate locking position to facilitate the assembly of the final structure.

It is another object of the present invention to provide a support structure which may be assembled or disassembled without the use of screwdrivers, pliers or other tools.

Other objects and advantages of the invention will hereinafter become more fully apparent from the following description of the annexed drawings, which illustrate preferred embodiments.

Brief Description of the Drawings

FIG. 8 is a perspective view with a partial cut away view showing the fastening device in its intermediate locking position.

FIG. 9 is an exploded view of the invention illustrating the relative positioning of the fastening device and end connectors.

Description of the Preferred Embodiment

Figure 1:
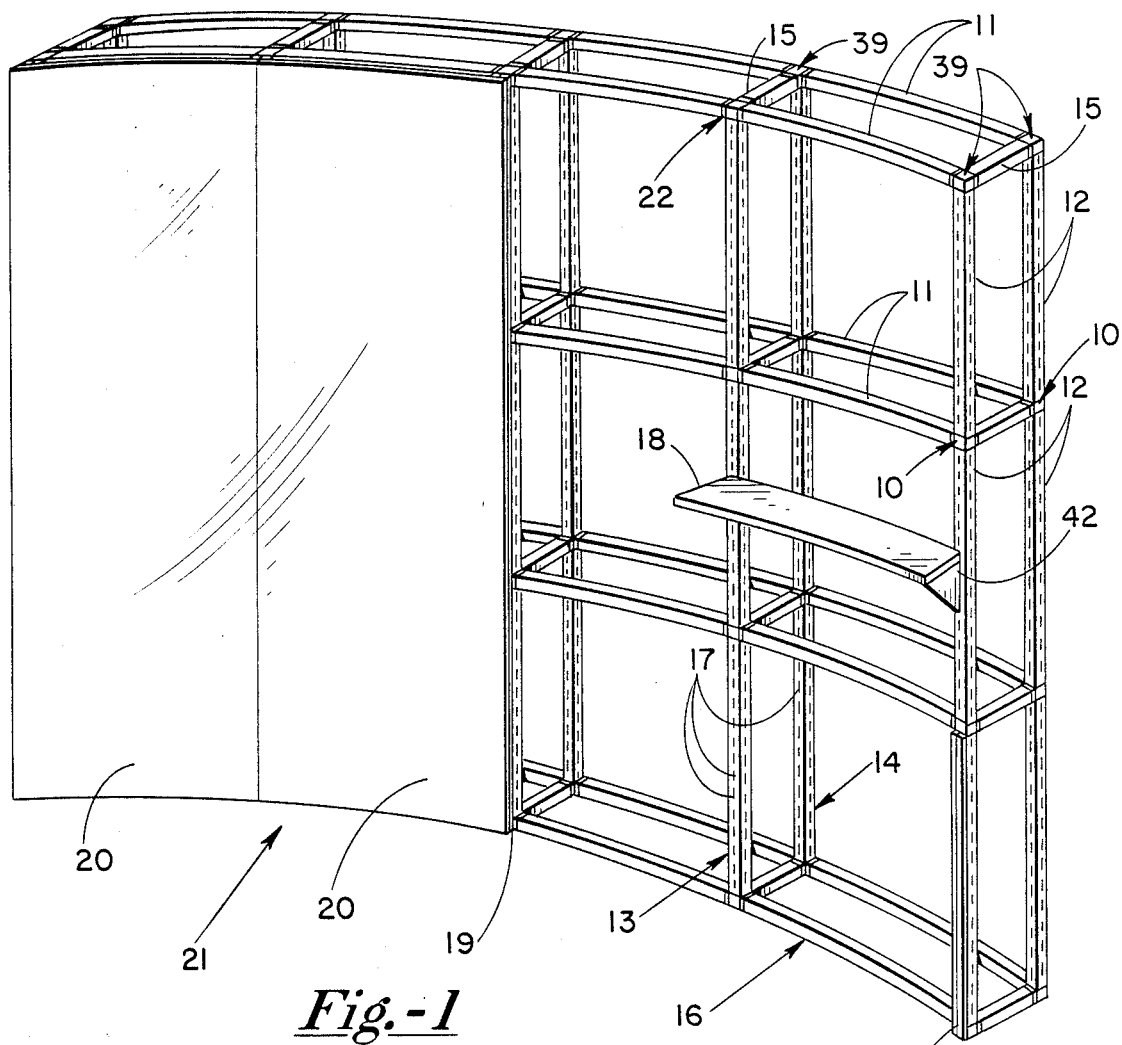
FIG. 1 is a perspective view of a display frame assembled in accordance with the present invention.

Referring to the drawings, there is shown in FIG. 1, a perspective view of a display unit 21 assembled in accordance with the present invention. Display unit 21 includes a plurality of horizontal members 11 fastened to a plurality of vertical members 12 by means of a plurality of fastening devices 10. The fastening device 10 is the basic unit from which many different structures may be assembled. In FIG. 1, a group of fastening devices 10 attach horizontal members 11 to vertical members 12 to form a first support frame section 13. The first support frame section 13 is then attached to a similarly constructed second support frame section 14 by lateral members 15 to create a framework which may be used as a display frame 16. It should be apparent that not every horizontal, vertical or lateral member shown in FIG. 1 need be used.

The vertical members 12 contain evenly spaced slots or channels 17 aligned vertically along each face of the vertical members 12 to facilitate attachment of shelves 18 or the like to the display frame 16. The vertical or hook and loop "Velcro" tape members 12 may also have magnetic strips 19 attached to the channels 17 to allow the placement of display panels 20 on the display frame 16. Such display panels 20 would have corresponding magnetic edge surfaces to adhere to magnetic strips 19. The addition of display panels 20 to the display frame 16 creates a rigid display unit 21 which has the appearance of a custom designed display structure.

It is contemplated that the horizontal, vertical and lateral members, 11, 12 and 15, be constructed of extruded aluminum tubing which may be produced as straight, angled or curved members depending on the desired configuration or size of the display frame 16. The ends of these support members further include 45° fillets 38 (see FIG. 9) on their inside corners to facilitate the slidable insertion of end connectors 22 (see FIGS. 5–7) and fastening devices 10 (see FIGS. 3–4) into the respective support members. The end connector 22 and fastening device 10 are preferably constructed of die-cast metal to enable their manufacture to precise specifications and therefore provide a consistently tight fit within the tubular support members.

The vertical members 12 may be of uniform construction, preferably formed of extruded aluminum tubing of square cross section. Each of the four elongate faces of a vertical member 12 has a plurality of spaced slots 17 adapted for holding shelf hanging brackets and the like. The ends of vertical members 12 are specially formed to accommodate insertion of fastening devices 10. For example, FIG. 9 shows respective end portions of vertical members 12, the end portion 31 particularly illustrating the slotted portion 33 and 33a which is designed to accept a keyed screw 29. Also shown on FIG. 9 is an end portion 28 of a vertical member 12, having a hole 27a which is aligned with set screw 27 (see also FIG. 2) after insertion of fastening device 10 into the opening of end 28. In a preferred embodiment, both ends of each vertical member 12 may be similarly configured, wherein each end has a slot 33/33a extending inward from the end of one elongate face, and a hole 27a positioned inwardly of an opposite elongate face. This preferred construction enables either end of vertical member 12 to accept either end of a fastening device 10.

Figure 2:
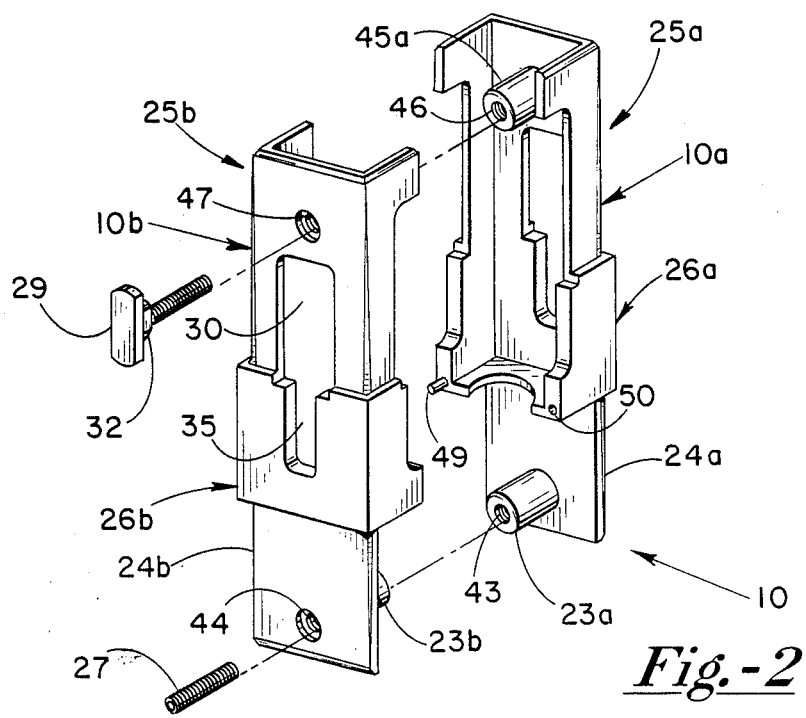
FIG. 2 is an exploded perspective view of the fastening device of the present invention.

FIG. 2 illustrates the preferred construction of a fastening device 10. Fastening device 10 may be formed of two essentially mirror image halves 10a and 10b, although some differences exist as between the respective halves 10a and 10b. For example, half 10a has an extended end 24a which has affixed thereto a pedestal 23a. Pedestal 23a has a non-threaded central recess 43 which is sufficiently large to accept an end of set screw 27. Fastening device half 10b has an extended end 24b which has affixed thereto a projecting pedestal 23b; however, a threaded hole 44 is tapped entirely through pedestal 23b to accept threaded set screw 27. The length of the threaded set screw 27 is precisely determined so that when the inner end of the set screw 27 contacts pedestal 23a the opposite end of the set screw 27 is flush with the surface of extended end 24b. Similarly, fastening device half 10a has a pedestal 45a affixed to its other end 25a, wherein pedestal 45a has a non-threaded recess 46 which is sized to receive and accept an end of keyed screw 29. Fastening device half 10b has a pedestal 45b on its other end 25b, but a threaded hole 47 passes entirely through pedestal 45b, and is sized to accept the threads of keyed screw 29. A tapered pin 49 projects from an inner corner surface of fastening device 10a, and a tapered recess 50 is formed into the opposite corner surface of fastening device 10a. Fastening device 10b has a similar recess and pin, each aligned opposite a corresponding pin and recess of fastening device 10a, and sized for interference fitting therebetween. Fastening device halves 10a and 10b are formed into a unified fastening device 10 by compressing the respective raised pins into opposing tapered recesses 50 to thereby force an interferring and bonding fit between the respective raised tapered pin and tapered recess. After the respective halves have been compressed together the fastening device 10 becomes a unitary, single piece.

Figure 3:
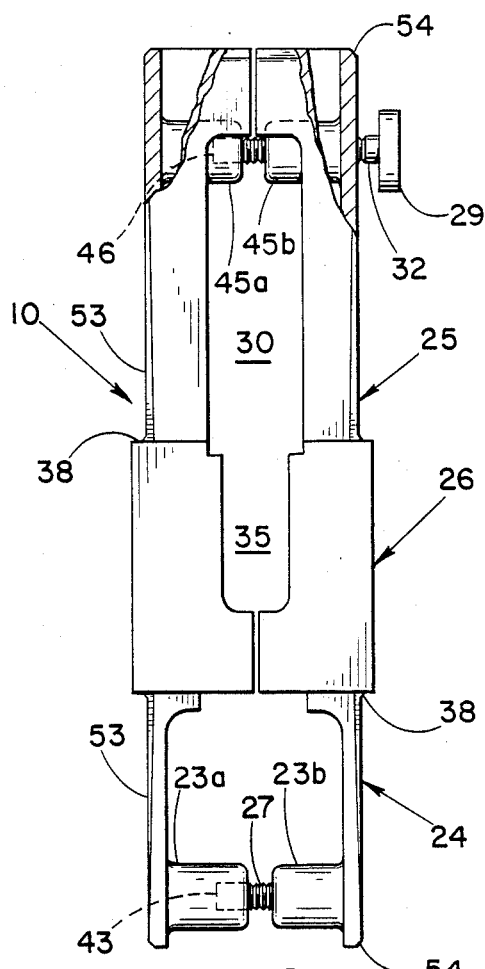
FIG. 3 is a side view of the fastening device of the present invention.
Figure 4:
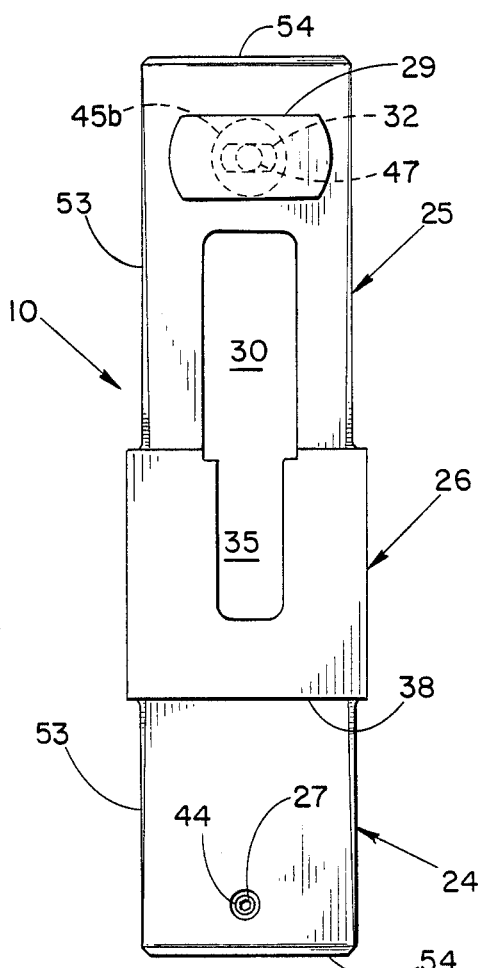
FIG. 4 is a front view of the fastening device of the present invention.

FIGS. 3 and 4 illustrate another view of the preferred construction of a fastening device 10. Fastening device 10 is comprised essentially of three sections: an extended end 24, formed of the two extended end sections 24a and 24b; a slidable end 25, formed of the two slidable end sections 25a and 25b; a central section 26, formed of the two central half sections 26a and 26b. The extended end 24 of fastening device 10 is inserted into an end 28 of a vertical member 12. The set screw 27 is then tightened to expand the width of extended end 24 to provide a tight frictional fit inside the interior surfaces of vertical member 12. Once the extended end 24 has been inserted into an end 28 of vertical member 12, and set screw 27 has been fully tightened, the locking device 10 becomes affixed to the end of vertical member 12, and is normally not removed.

The slidable end 25 of the fastening device 10 includes a keyed screw 29 and an elongate sliding slot 30 opening into a narrowed slot 35. The length of the keyed screw 29 is precisely determined so that when its inner end contacts pedestal 45a, the outer end of the keyed screw 29 extends outwardly from the surface of the slidable end 25 with the shoulder section 32 of keyed screw 29 in the slot 33 or 33a of a vertical member 12. The slot 33 on the vertical member 12 is slightly larger than the longest dimension of shoulder section 32, and the slot 33a is slightly larger than the narrow dimension of shoulder section 32. By turning keyed screw 29 to the position shown in FIG. 4, slidable end 25 fits only partially into an end 31 of a vertical member 12, becoming stopped at narrowed slot 33a, (see FIG. 8). Therefore, by turning the keyed screw 29 to a horizontal orientation, as shown in FIGS. 3 and 4, the second end 31 of the vertical member 12 is held in an intermediate locking position by the shoulder section 32 on the keyed screw 29 which contacts the narrower top slot 33a adjacent slot 33 (illustrated in FIG. 8). By rotating the keyed screw 29 to a vertical orientation (see FIG. 9) the shoulder section 32 is turned so as to pass through the narrow slot 33a on vertical member 12.

To facilitate the insertion of the ends, 24 and 25, of the fastening device 10 into the vertical members 12, chamfers, 53 and 54, are located longitudinally along the corners and ends of the respective ends 24 and 25. The longitudinal chamfers 53 are preferably deepest along the medial surface of the inner edge and gradually decrease in depth distally outwardly along the edges of each end, 24 and 25.

The center section 26 of the fastening device 10 has an outside dimension larger than the outer dimension of either the extended end 24 or the slidable end 25 to enable the first and second ends, 28 and 31, of the vertical members 12 to contact fillets 38 between the corners of the center section 26 and the edges of each end 24, 25 when the display frame 16 is assembled. The center section 26 further includes a locking slot 35 which is narrower than the sliding slot 30 on the slidable end 25. The use of the narrower locking slot 35 provides a tight fit between the male connector 34 on an end connector 22 and the center section 26 on the fastening device 10.

Figure 5:
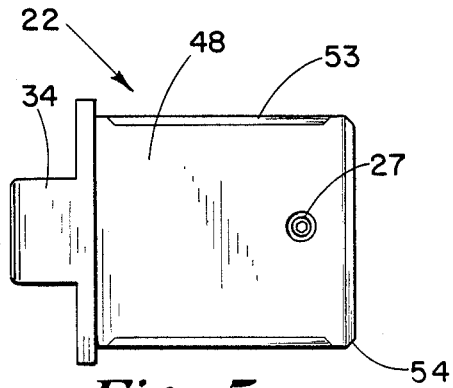
FIG. 5 is a top view of the end connector of the present in invention.
Figure 6:
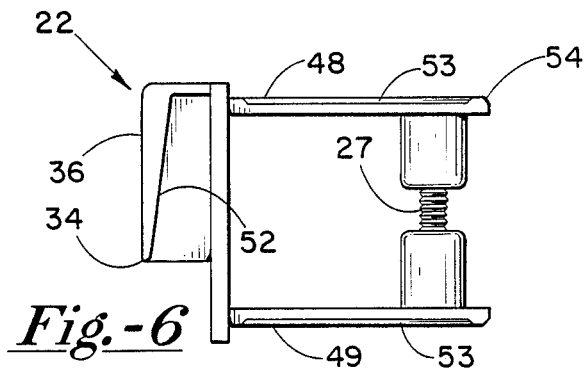
FIG. 6 is a side view of the end connector of the present invention.
Figure 7:
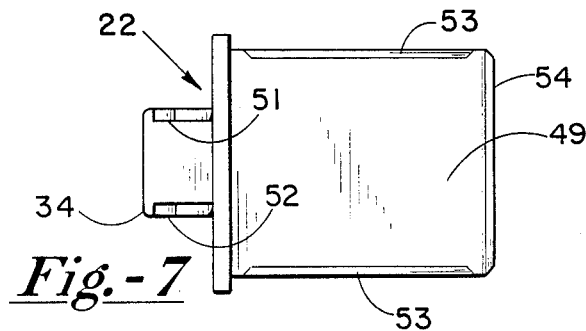
FIG. 7 is a bottom view of the end connector of the present invention.

FIGS. 5–7 illustrate the preferred construction of an end connector 22. As in the extended end 24 of the fastening device 10, the end connector 22 includes an adjustable set screw 27 to adjust the width dimension between the sides 48 and 49 of the end connector 22. Set screw 27 is threaded through one of the pedestals on side 48 or side 49, and the pedestal on the other side has a non-threaded recess to accept the end of set screw 27. The length of the set screw 27 is precisely determined so that when the inner end of the set screw 27 contacts the nonthreaded pedestal, the outer end of the set screw is flush with or just below the outer surface of the end connector 22. As with the extended ends 24 and the slidable ends 25 of the fastening device 10, longitudinal chamfers 53 are located along the edges of the end connector 22 and end chamfers 54 are located on the distal end of each end connector 22. The end connector 22 slidably inserts into the end of a horizontal member 11. Once the end connector 22 is inserted into the end of a horizontal member 11, the set screw 27 is turned, through an aligned opening in the horizontal member, to expand the width dimension of the sides 48 and 49 of end connector 22 and to provide a tight frictional fit at contact points within the end of the horizontal member 11. The end connector 22 further includes an outwardly projecting male connector 34 and a guide section 36 extending beyond the end of the horizontal member 11. The guide section 36 extends perpendicularly from the end of the male connector 34 and guides the male connector 34 into tapered engagement with the locking slot 35. The contact occurs by reason of a tapered interference between the wedged surfaces 51 and 52, against fastening device 10, which compensates for all dimensional tolerances between the components.

Figure 10:
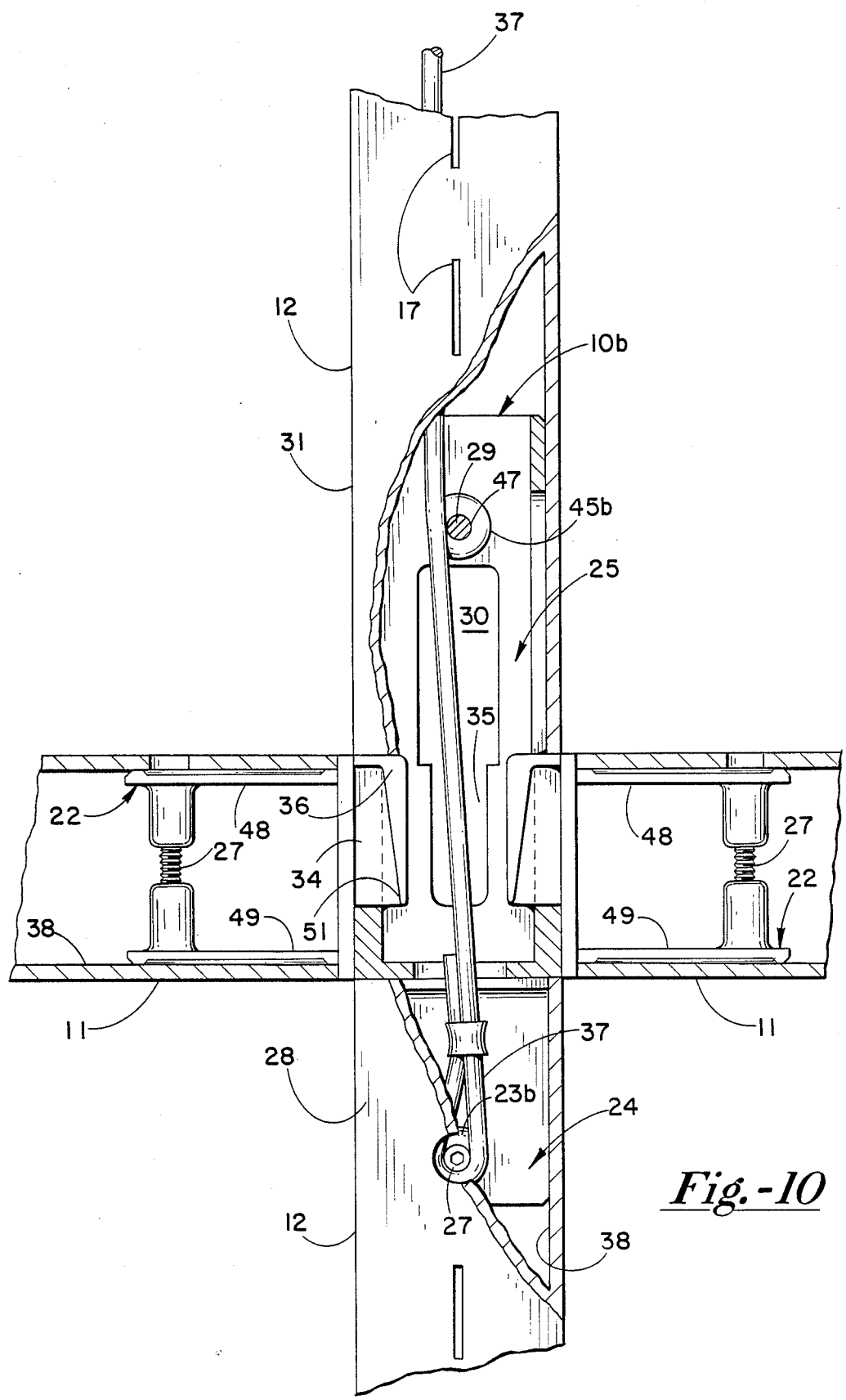
FIG. 10 is a perspective cutaway view of the invention illustrating the interaction of the end connectors and the fastening device.

FIGS. 9 and 10 illustrate the orientation and connection of the end connectors 22 to the fastening device 10 for assembly of a display frame 16. Additionally, in the preferred embodiment, an elastic cord 37 is used to maintain the proper end-to-end relationship of the vertical members 12 while the structure is assembled and disassembled. The elastic cord 37 facilitates reassembly of the framework because the vertical members 12 are flexibly coupled. The elastic cord 37 also helps to pull the first and second ends, 28 and 31, of the vertical members 12 into close contact with the fastening device 10.

Assembly of a structure similar to the display unit 21 in FIG. 1 may be accomplished rapidly and without the need for numerous specially adapted connectors. During the original assembly of the display frame 16, the end connectors 22 are inserted into the ends of all of the horizontal members 11 and lateral support members 14. Next, the set screws 27 are turned to expand the ends of the end connectors 22 to contact fillets 38 located on the inner corners of the horizontal and lateral members, 12 and 14. Similarly, the extended ends 24 of the fastening devices 10 are inserted into the first ends 28 of each vertical member 12 until the first end 28 contacts the fillets 38 on the center section 26. The set screws 27 are then turned to expand each extended end 24 until further fillets 38 on the inner corners of the vertical members 12 are contacted. Once these expandable ends are inserted into their respective support members, they remain attached to the support members and need not be removed unless they become damaged or broken.

In practice, the foregoing procedure may be conducted as a factory pre-assembly activity, for it need be accomplished only one time, and is not related to the normal steps of assembly and disassembly of the portable framework. A further pre-assembly step which may be accomplished at this time is the attachment of elastic cords to an appropriate arrangement of vertical members 12. This step is accomplished after it has been determined what the vertical height of the display frame 16 is to be in final form. The cord attachment step is illustrated in FIG. 10, wherein elastic cord 37 has respective ends formed into a fixed loop, one loop and being fitted about set screw 27 in an end 28 of the vertical member 12. The elastic cord 37 is then fed through the interior of one or more further vertical members 12, as determined by the ultimate height of display frame 16, and the other end of elastic cord 37 is looped about a further set screw 27 in the distal vertical member 12. In this manner, any reasonable number of vertical members 12 may be coupled in a resilient end-to-end relationship, in much the nature of assembly of supporting struts for camping tents. This permits the requisite number of vertical members 12 to be loosely held together and oriented, and facilitates the ultimate assembly and disassembly of a display frame 16. The resiliency of elastic cord 37 also facilitates the snap-locking action which is achieved in cooperation with keyed screws 29 and their associated locking grooves 33 and 33a.

Next, the first and second ends, 28 and 31, of the vertical members 12 are aligned so that when the keyed screw 29 of the fastening device 10 is turned to a horizontal position the keyed screw 29 is aligned with the groove 33 on the second end 31 in an intermediate locking position. The second end 31 of the vertical member 12 is fitted over the slidable end 25 until the intermediate locking position is reached. Elastic cord 37 assists in holding the aligned vertical members in this intermediate locking position. When the vertical members 12 are aligned in the intermediate locking position, the end connectors 22 are inserted into the sliding slot 30, and moved into locking slots 35. Once the guide section 36 of the end connector 22 is inserted beyond the sides of the locking slot 35, the keyed screw 29 is turned to allow the first and second ends, 28 and 31, of the vertical members 12 to slide, with the assistance of elastic cord 37, into their final locked position adjacent the fillets 38 on the center section 26 of the fastening device 10. When the vertical members 12 reach their final locked position, the horizontal member 11 and the end connector 22 are in confronting relation with the locking slot 35 to provide a rigid structural joint wherein the guide section 36 of the end connector 22 prevents any movement of the end connector 22 within the locking slot 35. This locking procedure is repeated at each joint until a display frame 16 of the desired shape and size is constructed. The keyed screws 29 may then be tightened to complete the locking procedure.

Once the display frame 16 is assembled, panels 20 and shelves 18 may be attached to the vertical members 12. Although the panels 20 are preferably constructed of flexible materials, conventional materials such as plywood or particle board may be used. The panels 20 may be attached to the vertical members 12 by using strip magnets 19 or hook and loop tape, on the back of the panels 20 and on the vertical members 12. These magnets 19 are aligned vertically along both sides of the slots 17 to provide a nearly invisible seam between the panels 20. The use of flexible materials for the panels 20 allows the placement of panels 20 around each end of the display frame 16. Finally, shelves 18 may be added to the display unit 21 by inserting support braces 42 into the slots 17 to provide a surface for placement of the shelf 18.

Figure 11:
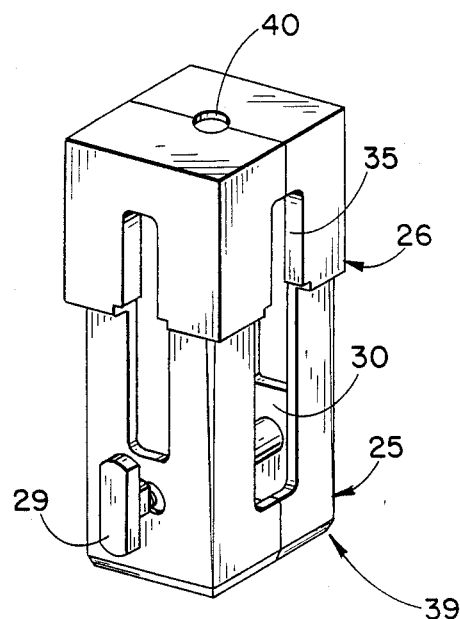
FIG. 11 is a perspective view of a modified fastening device.

The top and bottom rows on the display frame 16 are assembled in the same manner as in the other joints, except that the modified fastening device 39 (FIG. 11), does not have an extended end 24 and therefore only the slidable end 25 of the modified fastening device 39 attaches to the vertical member 12. Additionally, the modified fastening device 39 includes an attachment opening 40 on its top surface to facilitate the attachment of various accessories such as lights, banners, etc.

Figure 12:
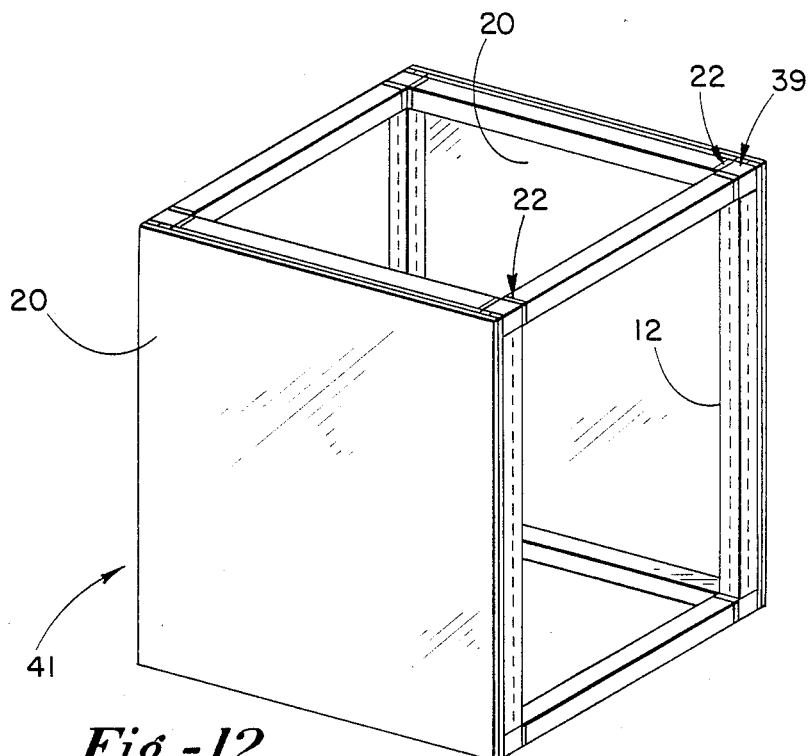
FIG. 12 is a perspective view of an alternate embodiment of the invention.

FIG. 12 illustrates a table-type display structure 41 which may be assembled using the modified fastening device 39 described above. This display structure 41 may use panels and a table cover (not shown) which attach magnetically to the framework to provide a sturdy table display 41 having an overall appearance similar to that of the display unit 21. This embodiment allows the user to store carrying cases or other materials inside the table framework for easy access whenever they are needed.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. For example, it is apparent that the present invention may be configured to form an infinite variety of display frame assemblies, beyond the particular embodiments illustrated herein. Vertical, horizontal and lateral members may be curved, angled or formed into unequal lengths to construct practically any type of frame assembly. Complex wall and beam structures may also be formed using the basic teachings of the present invention. Of course, it is also apparent that the basic teachings of the present invention may be utilized for purposes other than portable exhibit frames, including enclosures of all types and configurations.

What is claimed:

1. A fastener and lock for use in securing frame structural members of support structures, comprising
   (a) a fastening device having a center section and first and second end sections, said first end section having means thereon so as to fixedly attach said first end section to a first structural member so as to preclude axial movement relative thereto, said second end section being slidably and releasably attachable to a second structural member and including an adjustment means for releasably holding said fastening device and said second structural member either in a fully assembled position wherein the second structural member abuts said center section, or in an intermediate assembled position wherein said first section is partially inserted into said second structural member; and said center section having a receiving slot; and
   (b) an end connector being attachable to one end of a third structural member, said end connector projecting beyond the end of the third structural member and having a tapered head adapted to be received into said receiving slot in said fastening device to produce friction locking engagement between the end connector and fastening device.

2. The apparatus of claim 1, wherein the center section receiving slot extends from the center section of the fastening device into the second end section of the fastening device and has a width dimension which is larger in the second end section than in the center section of the fastening device.

3. The apparatus of claim 1, wherein the structural members are tubular and the first and second end sections of the fastening device expandably fit within the ends of the first and second structural members.

4. The apparatus of claim 3, wherein the end connector expandably fits within the end of a third structural member.

5. The apparatus of claim 1, wherein the first and second structural members are interchangeable and are alignable as support members and the third structural member is alignable as a cross member between a first and second fastening device and the second end of the third structural member has a further end connector inserted therein for attachment to the second fastening device.

6. The apparatus of claim 1, further comprising means for magnetically attaching panels to the structural members.

7. The apparatus of claim 1, wherein the structural members have channels therein for the removable attachment of shelves to the structural members.

8. A support structure frame adapted for ease of assembly and disassembly, comprising
   (a) a plurality of tubular members having a rectangular cross section, said tubular members being subdivided into a first group wherein all members have one end with an end slot including a wider end portion and a narrower inner portion and have another end with an access opening proximate said another end, and a second group; without said end slot;
   (b) a plurality of locking devices adapted for insertion into the ends of tubular members of the first group, each of said locking devices comprising a first spreadable end section having a threadable set screw between spreadable ends, said set screw becoming aligned with said access opening when said first spreadable end section is inserted into an end of a tubular member of the first group; a second spreadable end section having a threadable keyed screw between spreadable ends, said keyed screw being alignable with said end slot; and an intermediate locking section having a slot therein; and (c) a plurality of end connectors adapted for insertion into the ends of tubular members of the second group, each of said end connectors having a male end sized for fitting into said intermediate locking section slot.

9. The apparatus of claim 8, wherein said keyed screw further comprises a keyed shoulder having a first dimension sized for fitting into said end slot wider end portion, and having a second dimension sized for fitting into said end slot narrower inner portion.

10. The apparatus of claim 9, further comprising elastic means for end-to-end alignment of tubular members of said first group.

11. The apparatus of claim 10, wherein said second spreadable end section further comprises an enlarged opening sized to accept said end connector male end and opening into said intermediate locking section slot.

12. The apparatus of claim 11, wherein said end connector male end further comprises a neck portion sized for fitting into said intermediate locking section slot and a larger head portion sized for fitting through said second spreadable end section enlarged opening but not through said intermediate locking section slot.

13. The apparatus of claim 12, wherein said head portion further comprises wedge-shaped surfaces for contacting said intermediate locking section.

14. A fastener and lock for use in support structures, comprising (a) a plurality of tubular structural members;
(b) a fastening device having a center section intermediate two end sections, and having an elongate slot in said center section, said two end sections each being insertable and attachable to a tubular structural member;
(c) an end connector insertable and attachable to a tubular structural member, said end connector having a projecting head on a narrowed neck, said head being adapted to be received by said elongate slot in said fastening device center section to produce locking engagement between the end connector and fastening device; and
(d) adjustment means connected to one of said fastening device end sections, said adjustment means being frictionally engageable against a tubular structural member to lock said one end section in a partially inserted position into said tubular structural member or to lock said one end section in a fully inserted position into said tubular structural member wherein the tubular structural member abuts said center section of said fastening device.

15. The apparatus of claim 14, further comprising an enlarged slot in said fastening device end section opening into said center section elongate slot, said enlarged slot sized to receive said end connector projecting head, and said center section elongate slot sized smaller than said end connector projecting head.

16. The apparatus of claim 15, wherein said fastening device two end sections each further comprise a pair of spreadable walls adapted for engagement against the inside of a tubular structural member, and a threadable set screw extending therebetween with means for relatively expanding the spacing of said spreadable walls.

17. The apparatus of claim 16, wherein said end connector further comprises a pair of spreadable walls adapted for engagement against the inside of a tubular structural member, and a threadable set screw extending therebetween with means for relatively expanding the spacing of said spreadable walls.

18. The apparatus of claim 16, wherein at least some of said tubular structural members further comprise an end having a slot opening, said slot having a first end width portion and a second narrower width inner portion.

19. The apparatus of claim 18, wherein one end section of said fastening device comprises a threadable set screw having a keyed neck portion, with a first dimension for fitting into both first and second width portions of said tubular structural member slot opening, and having a second dimension for fitting only into said first end width portion of said tubular structural member slot opening.

20. A support structure frame adapted for ease of assembly and disassembly, comprising (a) a plurality of hollow tubular members of substantially square cross section, said tubular members including a first group wherein all tubular members in said first group have at least one slot in a first end, said slot having a first end access opening, and having an access hole proximate a second end; said tubular members including a second group wherein all tubular members in said second group are without said end slot;
(b) a plurality of locking devices, each said locking device having three sections; including a first end section adapted for insertion into the slotted first end of any of said first group of tubular members and further comprising a threadable locking member for clamping said tubular member against said first end section, and intermediate section having a cross section size proximately equal to said tubular member cross section and having a slotted opening therethrough, and a second end section having a pair of spreadable walls adapted for engagement inside a second end of any of said first group of tubular members and a threadable screw engaged between said pair of spreadable walls, said screw being accessible through said tubular member second end access hole when said second end section is inserted into said tubular member second end; and
(c) a plurality of end connectors adapted for insertion and affixing into either end of a tubular member of said second group, each of said end connectors having means for engaging into said slotted opening in said locking device intermediate section.

21. The apparatus of claim 20, wherein each of said locking devices further comprise a slotted opening in an end section bridging into the slotted opening in the intermediate section, the end section slotted opening being of larger dimension than said intermediate section slotted opening.

22. The apparatus of claim 21, wherein each of said end connectors further comprise an enlarged head projecting from a narrower neck, said head having a dimension sized to fit through said locking device end section slotted opening but not through said locking device intermediate section slotted opening.

23. The apparatus of claim 22, further comprising resilient means for attaching at least two of said tubular members of said first group in relative end-to-end alignment.

* * * * *